(12) United States Patent
Adamenko et al.

(10) Patent No.: US 10,286,328 B2
(45) Date of Patent: May 14, 2019

(54) MODULAR ACCESSORY FOR VIDEO GAMING

(71) Applicant: Ubisoft Entertainment, Rennes (FR)

(72) Inventors: Vlad Adamenko, Toronto (CA); Matthew Severin, Toronto (CA); Douglas Gregory, Toronto (CA); James Everett, Wellington (NZ)

(73) Assignee: Ubisoft Entertainment, Rennes (FR)

( * ) Notice: Subject to any disclaimer, the term of this patent is extended or adjusted under 35 U.S.C. 154(b) by 88 days.

(21) Appl. No.: 15/177,642

(22) Filed: Jun. 9, 2016

(65) Prior Publication Data

US 2017/0354889 A1   Dec. 14, 2017

(51) Int. Cl.

| | |
|---|---|
| *A63F 9/24* | (2006.01) |
| *A63F 13/98* | (2014.01) |
| *A63F 13/65* | (2014.01) |
| *A63F 13/24* | (2014.01) |
| *A63H 3/36* | (2006.01) |
| *A63H 33/42* | (2006.01) |
| *A63H 17/00* | (2006.01) |
| *A63F 13/245* | (2014.01) |
| *A63F 13/58* | (2014.01) |
| *A63H 3/00* | (2006.01) |

(52) U.S. Cl.
CPC .............. *A63F 13/98* (2014.09); *A63F 13/24* (2014.09); *A63F 13/245* (2014.09); *A63F 13/65* (2014.09); *A63H 3/36* (2013.01); *A63H 17/00* (2013.01); *A63H 33/425* (2013.01); *A63F 13/58* (2014.09); *A63F 2300/1043* (2013.01); *A63F 2300/69* (2013.01); *A63H 3/00* (2013.01)

(58) Field of Classification Search
CPC .............. A63F 13/06; A63F 2300/1043; A63F 13/245; A63F 13/58; A63F 13/02; A63F 13/98; A63F 2300/1006; A63F 2300/807; A63H 13/00
See application file for complete search history.

(56) References Cited

U.S. PATENT DOCUMENTS

| | | | | |
|---|---|---|---|---|
| 5,766,077 A | * | 6/1998 | Hongo .................... | A63F 13/02 273/148 B |
| 5,853,327 A | * | 12/1998 | Gilboa ................ | A63F 3/00643 273/237 |
| 6,190,174 B1 | * | 2/2001 | Lam ....................... | A63H 33/42 273/237 |

(Continued)

OTHER PUBLICATIONS

Wikipedia, Lego Dimensions, Apr. 18, 2016, <https://en.wikipedia.org/w/index.php?title=Lego_Dimensions&oldid=715803832>.*
Amiibo; Wikipedia; Date: Oct. 11, 2016; <https://en.wikipedia.org/wiki/Amiibo>.
Disney Infinity; Wikipedia; Date: Oct. 10, 2016; <https://en.wikipedia.org/wiki/Disney_Infinity>.

(Continued)

*Primary Examiner* — Justin L Myhr
(74) *Attorney, Agent, or Firm* — Erise IP, P.A.

(57) ABSTRACT

Systems and method for using a modular game accessory to play a video game. A smart toy is presented that can be reconfigured by the player on the fly while playing the video game by adding and removing modules. When the smart toy is reconfigured, the capabilities of the player's in-game avatar are modified accordingly. In this way, the smart toy exists as a hybrid of a physical toy and video game avatar. Modules for modifying the smart toy can represent components and crew of the vehicle represented by the smart toy, and different modules can offer different capabilities to the in-game avatar.

19 Claims, 10 Drawing Sheets

(56) References Cited

U.S. PATENT DOCUMENTS

| | | | | |
|---|---|---|---|---|
| 6,290,565 | B1* | 9/2001 | Galyean, III | A63H 3/16 |
| | | | | 273/148 B |
| 6,773,325 | B1* | 8/2004 | Mawle | A63F 13/02 |
| | | | | 446/175 |
| 8,206,217 | B2 | 6/2012 | Witchey | |
| 8,678,924 | B2 | 3/2014 | Witchey | |
| 2007/0015588 | A1* | 1/2007 | Matsumoto | A63F 13/06 |
| | | | | 463/43 |
| 2011/0031809 | A1* | 2/2011 | Yoshida | B60R 16/0215 |
| | | | | 307/42 |
| 2014/0235353 | A1 | 8/2014 | Witchey | |
| 2015/0258435 | A1* | 9/2015 | Zhang | A63H 33/042 |
| | | | | 463/36 |
| 2016/0165597 | A1* | 6/2016 | Konopacki, Jr. | |
| | | | | H04W 72/0446 |
| | | | | 370/329 |
| 2016/0236085 | A1* | 8/2016 | Yano | A63F 9/24 |

OTHER PUBLICATIONS

Lego Dimensions; Wikipedia; Date: Oct. 7, 2016; <https://en.wikipedia.org/wiki/Lego_Dimensions>.
Skylanders Superchargers; Wii; Date: 2015; <https://support.activision.com/servlet/servlet.FileDownload?retURL=%2Fapex%2Fmanuals&file=00PU000000OqoCDMAZ>.
Skylanders; Wikipedia; Date: Oct. 11, 2016; <https://en.wikipedia.org/wiki/Skylanders>.
Skylanders Swap Force; Xbox; Date: 2013; <https://www.skylanders.com/content/dam/atvi/skylanders/base/parents/manuals/SSF_XOne_Manual_Online.pdf>.
Infinite Arms—Welcome to the Crux; Copyright 2016; Printed Date: Dec. 2, 2016; <http://infinite-arms.com>.
Lightseekers—PlayFusion; Copyright 2016; Printed Date: Dec. 2, 2016; <http://playfusion.com/lightseekers/>.
Lightseekers by PlayFusion—Kickstarter; Copyright 2016; Printed Date: Dec. 2, 2016; <https://www.kickstarter.com/projects/playfusion/lightseekers>.

* cited by examiner

MODULAR ACCESSORY FOR VIDEO GAMING

BACKGROUND

1. Field

Embodiments of the invention generally relate to video gaming and, more particularly, to modular, hybrid physical/virtual toys that can be physically manipulated by the player to modify the player's in-game avatar.

2. Related Art

Traditionally in video games, there has been a disconnect between the player's in-game avatar and the real world. The player configures the avatar in the game, and it exists purely virtually. The avatar can then be controlled using standard input devices. More recently, hybrid physical/virtual toys have become available that allow the player to select an avatar by placing a figurine of the character the player wishes to use on a special pedestal. However, this limits the player to certain fixed character configurations and, because the figurine must remain on the pedestal, means that the player cannot interact with the figurine while playing the video game. As such, there is a need for a modular, hybrid physical/virtual toy that can be dynamically reconfigured by the player to customize the in-game avatar, and with which the player can interact while playing the video game.

SUMMARY

Embodiments of the invention address the above-described need by providing for a modular game accessory that can be reconfigured by the player to alter the capabilities of the player's in-game avatar. In particular, in a first embodiment, the invention includes a system for playing a video game, comprising a modular game accessory including a base unit including a plurality of slots for attaching add-on modules, a plurality of add-on modules, each add-on module attachable to the base unit in a tree topology, a mount for mounting the modular game accessory to a video game controller, and one or more computer-readable media storing computer-executable instructions that, when executed, allow a player to control an in-game avatar in the video game, wherein an appearance and one or more capabilities of the in-game avatar are determined by the modular game accessory connected to the video game controller while playing the video game, and wherein each of the plurality of the add-on modules connected to the base unit affects at least one capability of the in-game avatar.

In a second embodiment, the invention includes a method of using a modular game accessory to play a video game, comprising the steps of receiving an indication that the modular game accessory comprising a base unit and a plurality of add-on-modules connected in a tree topology has been mounted on a video game controller, identifying the base unit of the modular game accessory, creating an in-game avatar in the video game corresponding to the identified base unit, identifying an add-on module of the plurality of add-on modules attached to the base unit, modifying at least one characteristic of the in-game avatar based on the identified add-on module, receiving a command input from the video game controller, and manipulating the in-game avatar based on the received command input.

In a third embodiment, the invention includes a system for playing a video game, comprising a modular game accessory including a base unit including a plurality of slots for attaching add-on modules and a plurality of add-on modules, each add-on module attachable to the base unit in a tree topology, a mount for mounting the modular game accessory to a video game controller, one or more computer-readable media storing computer-executable instructions that, when executed, perform a method of using the modular game accessory to play the video game, comprising the steps of receiving an indication that the modular game accessory has been mounted on the video game controller, identifying the base unit of the modular game accessory, creating an in-game avatar in the video game corresponding to the identified base unit, identifying an add-on module of the plurality of add-on modules attached to the base unit, and modifying at least one characteristic of the in-game avatar based on the identified add-on module.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention allow modular "smart toys" to interact with virtual video game experiences. In particular, the player can assemble and customize a toy, and then use the particular characteristics of that toy as the player's avatar or vehicle in a video game. As a representative example, a video game may involve piloting space ships of varying capabilities on different types of missions, with different missions favoring space ships of different capabilities. Broadly, the capabilities of an avatar are any characteristic that determines how the in-game avatar performs. For example, missions involving dog-fighting might be best attempted with an avatar including weapon pods, high maneuverability, and light armor, while a cargo mission would be better served with powerful engines and high cargo capacity instead.

These capabilities can be represented or affected by modules which can be assembled in the real world to form a smart toy, which represents a concrete manifestation of the virtual space ship. Thus, by removing one set of wing modules and replacing them with a different set, the capabilities of the virtual space ship can be changed. In the example above, the virtual space ship can be reconfigured for different missions by changing wing, weapon pod, and hull modules on the smart toy. The smart toy can be attached to a controller, allowing gestural control of the corresponding virtual avatar instead of or in addition to control using the controller itself.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environment for Embodiments of the Invention

Figure 1:
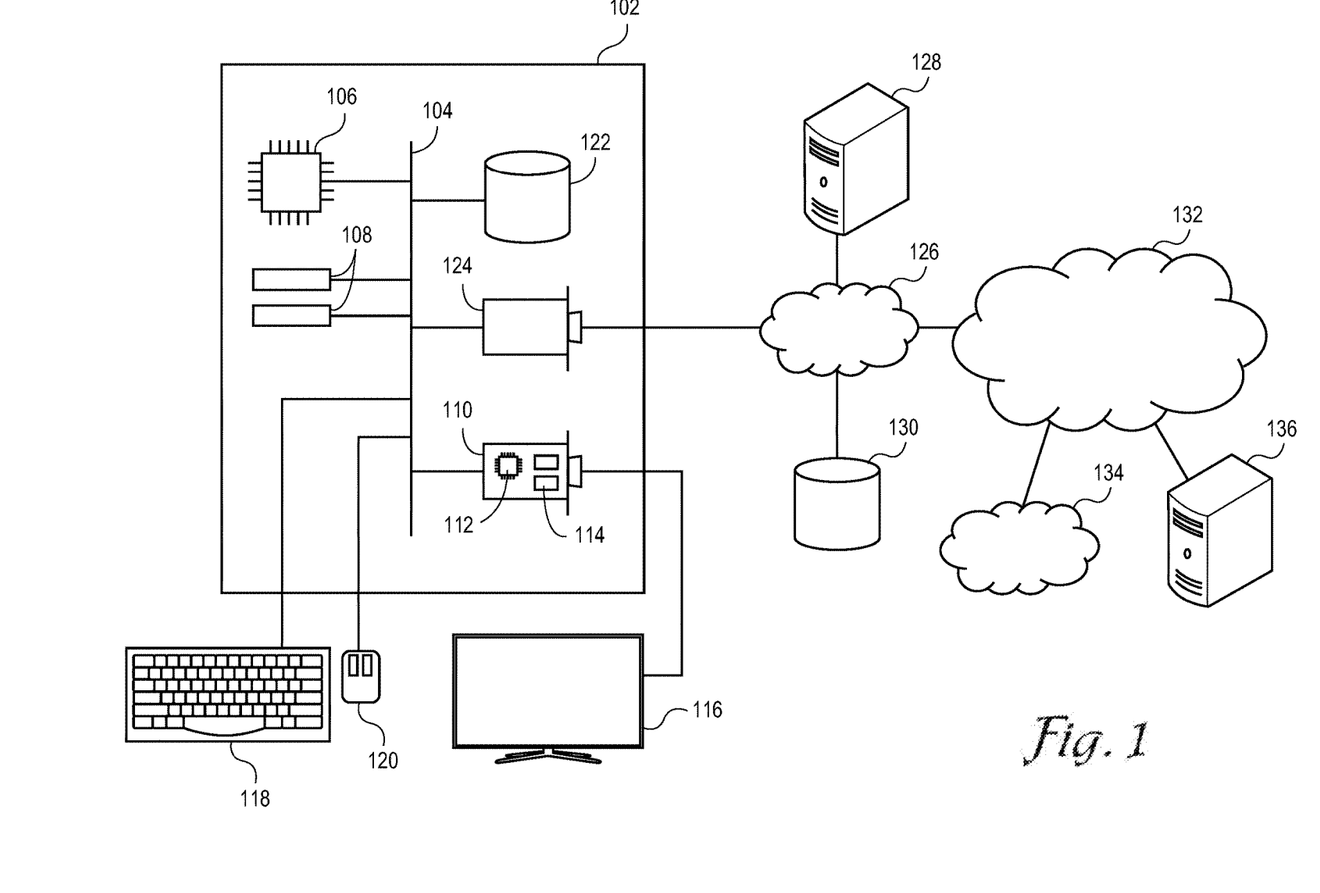
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. In some embodiments of the invention, computer 102 is a dedicated console for electronic gaming. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. In embodiments where computer 102 takes the form of a dedicated video game console, the peripherals attached to computer 102 may include one or more special purpose video game controllers. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Accessories in Accordance with Embodiments of the Invention

Figure 2:
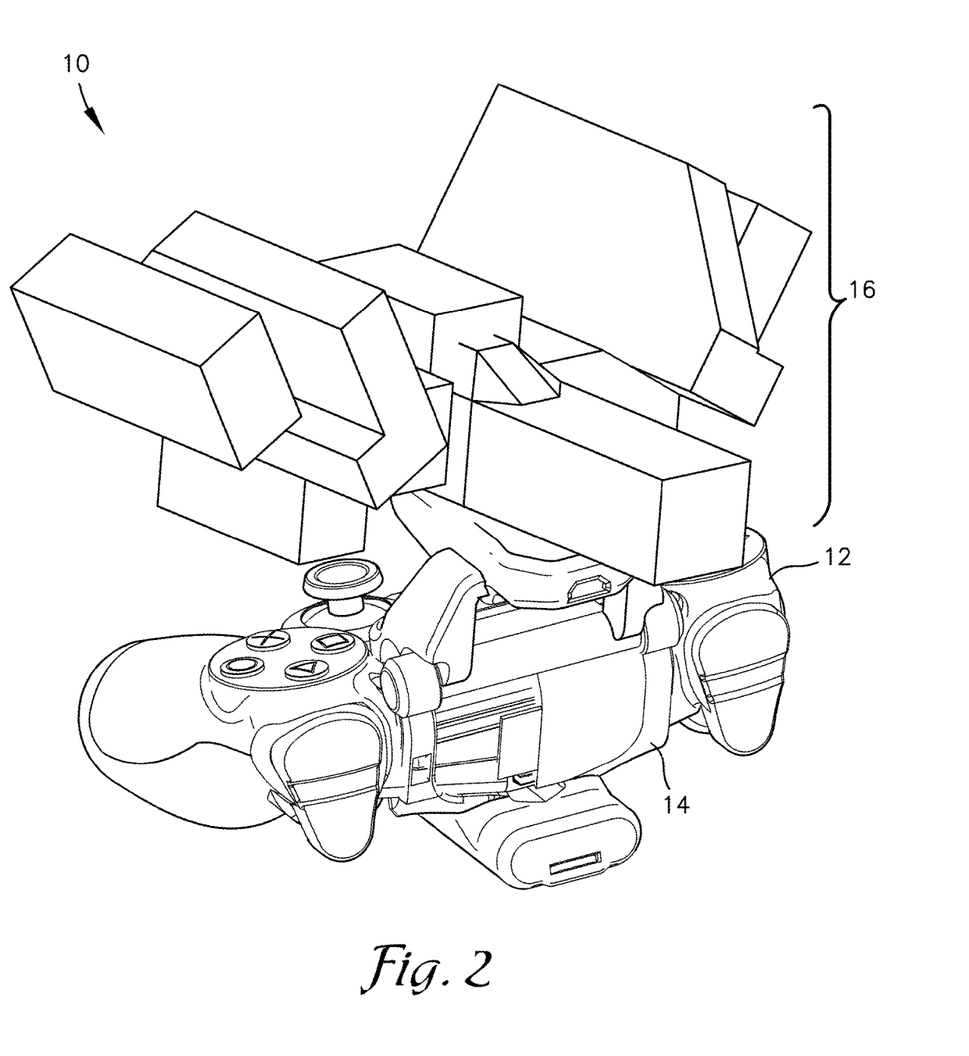
FIG. 2 depicts an oblique front view of a modular game accessory attached to a video game controller in accordance with embodiments of the invention.

Turning now to FIG. 2, an oblique front view of a modular game accessory attached to a video game controller in accordance with embodiments of the invention is depicted. A complete assembly of controller, mount and modular game accessory may be referred to generally by reference numeral 10. Game controller 12 may be a conventional game controller as used with a gaming console (such as, for example, a Sony® PlayStation® 4 or a Microsoft® Xbox™ One) or with a PC. Alternatively, depicted below in FIG. 11, it may be a dedicated controller designed to mount the modular game accessory. In the case where the modular game accessory is attached to a conventional game controller, mount 14 works to physically and/or electrically connect the modular game accessory, as described in greater detail below with respect to FIGS. 5 and 6.

Also depicted in the view of FIG. 2 is modular game accessory 16. When a player is controlling a virtual game avatar using assembly 10, modular game accessory 16 is securely attached to the controller in such a way that the player can easily take one hand off the controller and remove any of the modules of the modular game accessory 16 and exchange it for another module sitting on a table (for instance) in front of the player, or to entirely replace one modular game accessory with another modular game accessory. Modular game accessory 16 is described in greater detail below with respect to FIG. 3.

Figure 3:
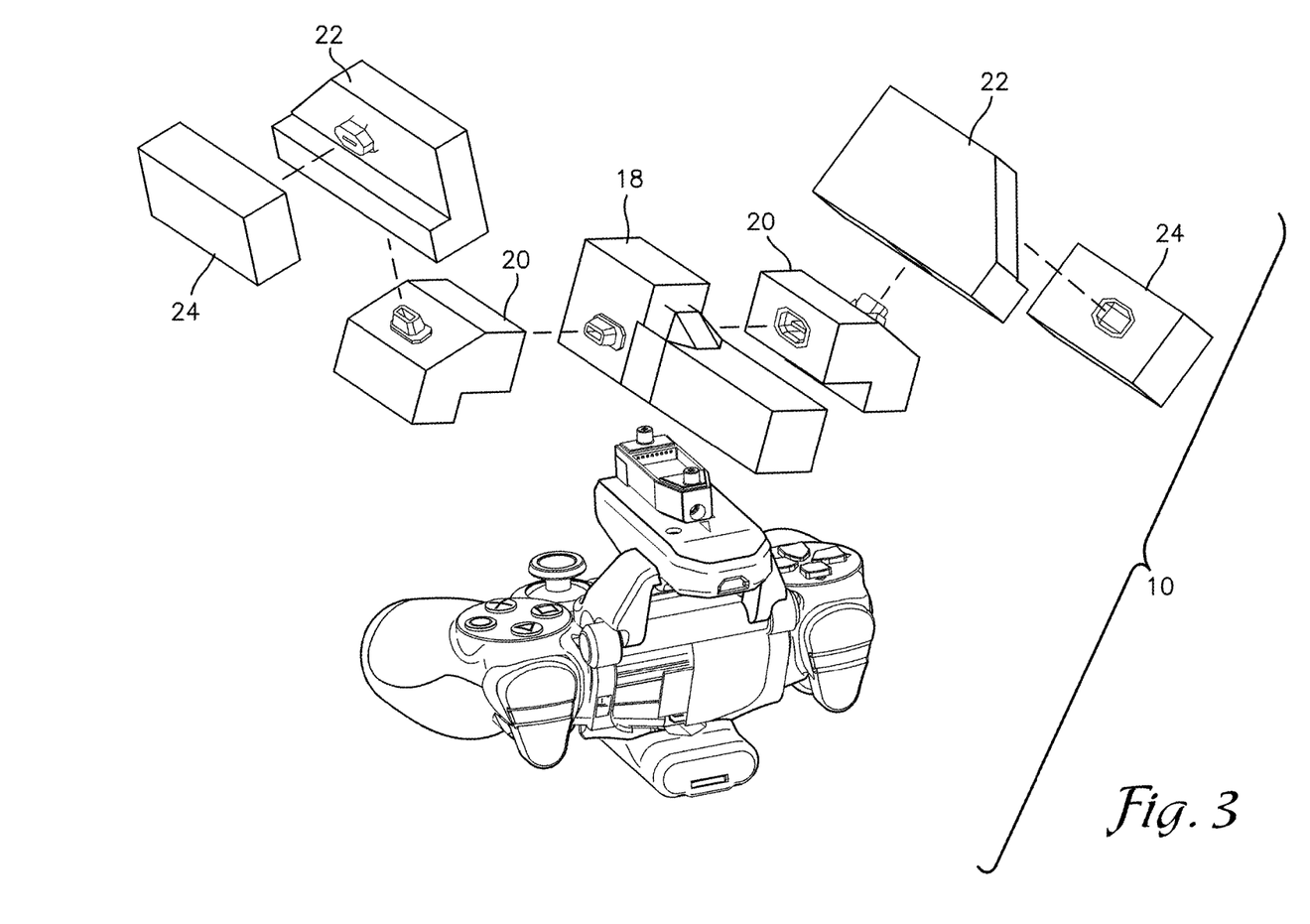
FIG. 3 depicts an exploded oblique front view of the modular game accessory attached to the video game controller.

Turning now to FIG. 3, an exploded oblique front view of the modular game accessory as it attaches to the video game controller of FIG. 2 is depicted. As depicted, modular game accessory 16 includes base unit 18. Other types of base unit are also envisioned as being within the scope of the invention. For example, instead of the depicted space ship hull, base unit 18 could instead represent a car chassis, a boat hull, an airplane hull or a tank hull. Base unit 18 may include one or more attachment points for physically connecting base unit 18 to mount 14, such as slots, tabs, or other connectors. Connection may be via a friction fit or via positive locking points on base unit 18 or mount 12. Base unit 18 may further include one or more electrical connectors for powering and/or communicatively coupling to base unit 18 and the other modules attached to it. In various embodiments, base unit 18 may represent different properties of the player's virtual avatar.

For example, if the player's virtual avatar is a space ship, then base unit 18 may represent the armor, cargo capacity, and/or crew complement of the virtual avatar. If instead the virtual avatar is a car or other land vehicle, then base unit 18 may instead represent the engines of the virtual avatar. In some embodiments, the base unit 18 may not itself represent any properties of the avatar but instead serve only as a platform for the modules that represent the avatar's properties. In some embodiments, each component of modular game accessory 16 affects a single, distinct property of the virtual avatar. In other embodiments, each component of modular game accessory 16 impacts a related set of properties (also known as a "constellation" of properties), and each property can be affected by more than one component.

Modular game accessory 16, as depicted, further includes a set of add-on modules such as extension modules 20 and 22, and leaf module 24. For example, extension modules 20 may represent the wings attached to base unit 18, extension modules 22 may be weapons racks attached to the wing modules and leaf modules 24 may be weapons pods connected directly to the weapon racks. In some embodiments, leaf modules can also connect directly to base unit 18, as shown below with respect to FIGS. 8 and 9. In some embodiments, different base units representing different types of vehicle will have different module slots. For example, the space ship vehicles (as in base module 18) has the depicted slots, while a car base unit would have slots for engine and wheel add-on modules. Similarly to how base unit 18 connects to mount 14, these add-on modules may connect physically and/or electronically to base unit 18. As is shown for leaf modules 22, some add-on modules may connect to other add-on modules which are in turn connected to base unit 18 rather than connecting directly to base unit 18 themselves. In some embodiments, a standardized connection is used to attach add-on modules so that modules can be attached either directly or indirectly. Some extension modules may include connections for more than one other extension modules or leaf modules to be attached. Thus, the components of modular game accessory are connected in a logical tree topology, with mount 14 (or base hull unit 18) corresponding to the root node, extension modules corresponding to branch nodes and leaf modules corresponding to leaf nodes. The tree topology may be two levels deep, three levels deep, four levels deep, or may be arbitrarily deep. In some embodiments, each module can only connect to a single other module, so that the modules form a chain topology. In some embodiments, properties of add-on modules may depend on their location in the topology, or the orientation in which they are attached. In such embodiment, the system can detect the location and orientation of each module within the logical connection topology. In this way, the game system can recognize and respond to how the player builds in addition to the modules they choose. Add-on modules are discussed further below with respect to FIGS. 9 and 10.

Figure 4:
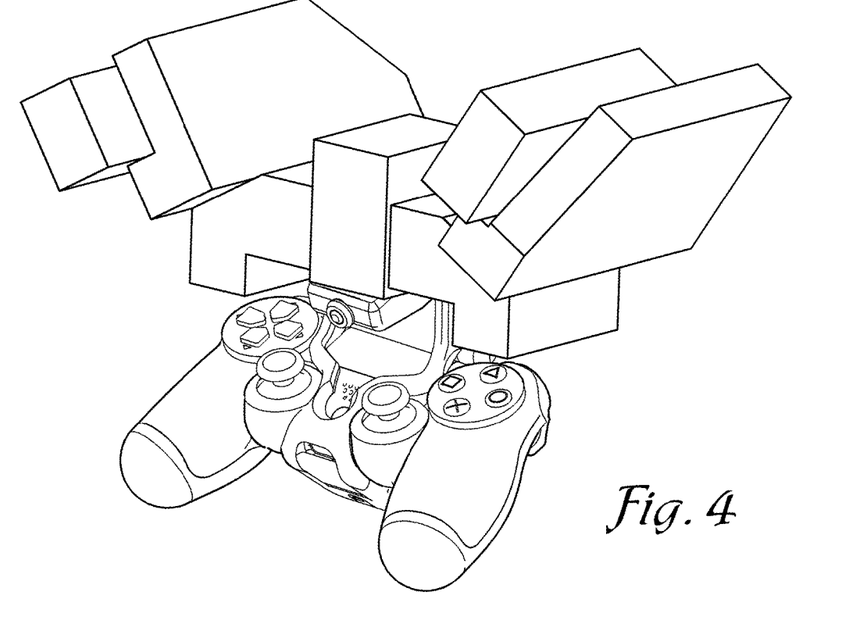
FIG. 4 depicts an oblique rear view of the modular game accessory attached to the video game controller.

Turning now to FIG. 4, an oblique rear view of the modular game accessory attached to the video game controller is depicted. It can be seen in the depicted embodiment that mount 14 attaches to game controller 12 in such a way that the buttons and other controls of game controller are not obstructed and can still be used. Rather, as described above, modular game accessory 16 is kept securely attached to game controller 12 such that assembly 10 can be used as a unit, and such that the player can operate all of the buttons, control sticks, and other inputs of game controller 12 unimpeded. When game controller 12 includes gyroscopes, accelerometers, or other motion controls, the player may be able to control the virtual avatar by physically manipulating modular game accessory 16 using game controller 12 to which it is attached. In some embodiments, modular game accessory 16 may further include one or more indicators (such as, for example, LEDs) for displaying information about the components of modular game accessory. For example, the various add-on modules could have a multicolor LED to indicate damage taken by the corresponding virtual component.

Figure 5:
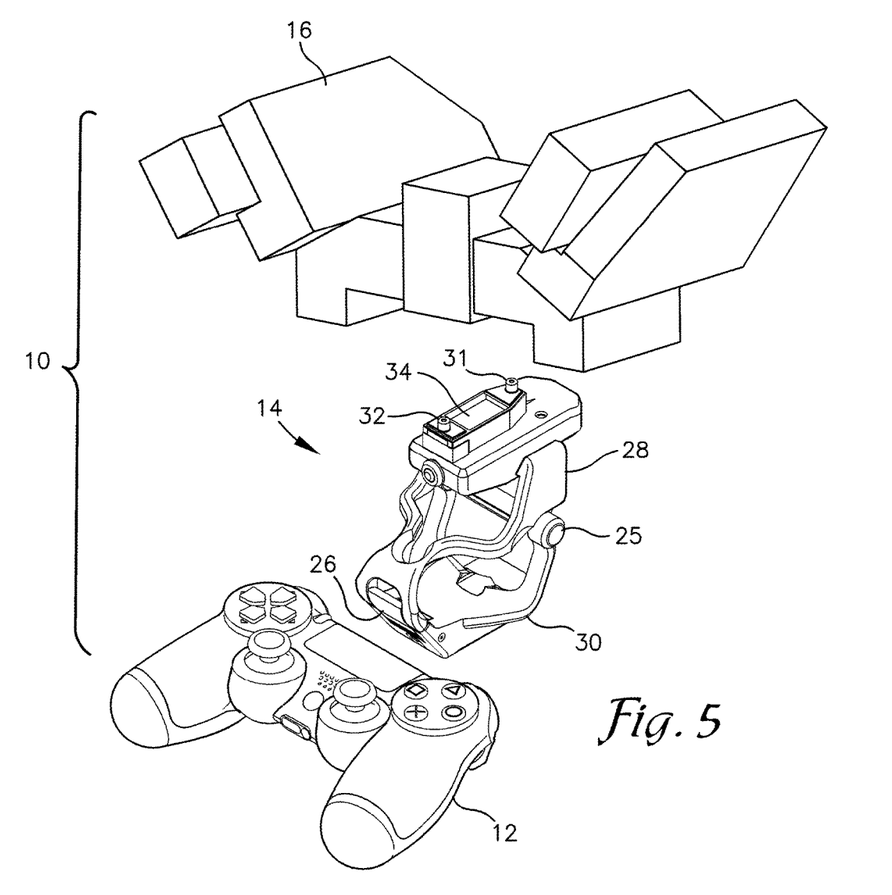
FIG. 5 depicts a oblique rear view of the detached modular game accessory, the mount for attaching it to the video game controller, and the game controller.
Figure 6:
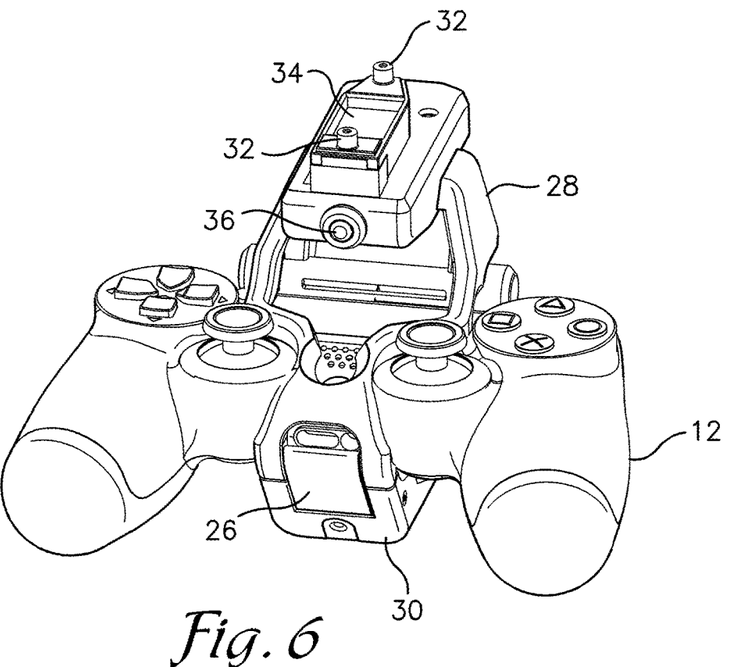
FIG. 6 depicts an oblique rear view of the mount for the modular game accessory as attached to the video game controller.
Figure 7:
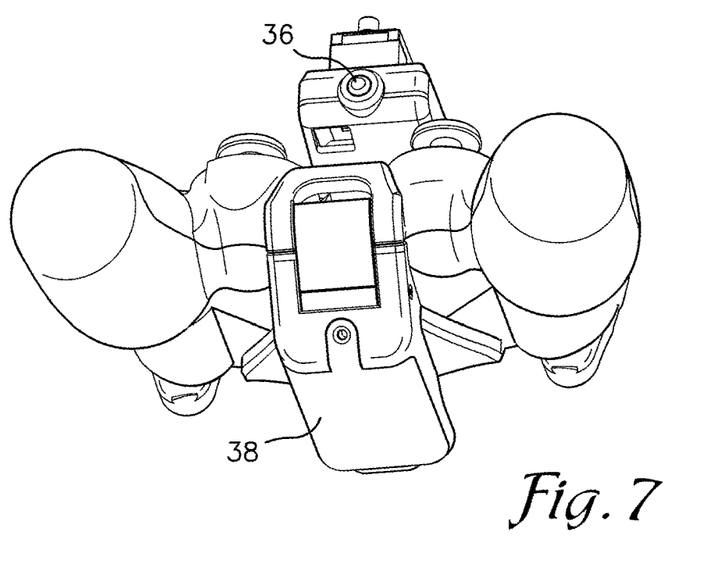
FIG. 7 depicts oblique bottom-rear view of the mount for the modular game accessory as attached to the video game controller.

Turning now to FIG. 5, a oblique rear view of the detached modular game accessory 16, mount 14 for attaching it to the video game controller, and game controller 12 is depicted. As depicted mount, 14 attaches to game controller 12 by way of hinge 25 and latch 26 connecting upper mount 28 to lower mount 26. Thus, to attach mount 14 to controller 12, the player can disengage latch 26 and pivot lower mount 30 down to open mount 14. Once game controller 12 is inserted into mount 14, lower mount 30 can be pivoted back up and latch 26 reengaged to secure mount 14 around controller 12. FIGS. 6 and 7 below depict mount 14 as attached to controller 12 without modular game accessory 16 attached. Upper mount 28 further includes the above-described physical connectors 32 and (in some embodiments) electrical connector 34 for powering and communicating with modular game accessory 16. In this way, different modular game accessories can be mounted on controller 12, as described in greater detail below.

In some embodiments, modular game accessories such as modular game accessory 16 may be usable across multiple different video games. In other embodiments, modular game accessory may be useable outside the context of the video game. For example the modular game accessory may include buttons, speakers, lights, or make use of those on a connected controller to provide interaction when not connected to a computing device. For example, pushing buttons associated with various avatar abilities could cause corresponding sounds to play and/or lights to light up corresponding to those abilities on the modular game accessory. In another embodiment, the modular game accessory can include infrared transmitters and receivers to allow players to play a game of laser tag in physical space and, by swapping modules, choose special abilities and/or replace damaged components.

Turning now to FIG. 6, an oblique rear view of the mount for the modular game accessory as attached to the video game controller is depicted. This figure more clearly illustrates physical connectors 32 and electrical connectors 34 for coupling modular game accessory 16 to mount 14 and thereby to game controller 12. In some embodiments, mount 14 may further include button 36 (or other control) for initializing, powering, or otherwise controlling modular game accessory 16.

Turning now to FIG. 7, oblique bottom-rear view of the mount for the modular game accessory as attached to the video game controller is depicted. In some embodiments, mount 14 is powered from and communicates with game controller 16 via electrical connections. In other embodiments, mount 14 is self-powered and communicates wirelessly with game controller 12 (or with computer 102 directly). In some such embodiments, mount 14 may include battery door 38 giving access to replaceable batteries. In other embodiments, mount 14 may include rechargeable batteries and connectors for recharging them. In some embodiments featuring rechargeable batteries, mount 14 may connect to a recharging port for controller 12 and recharge via a pass-through connection.

Figure 8:
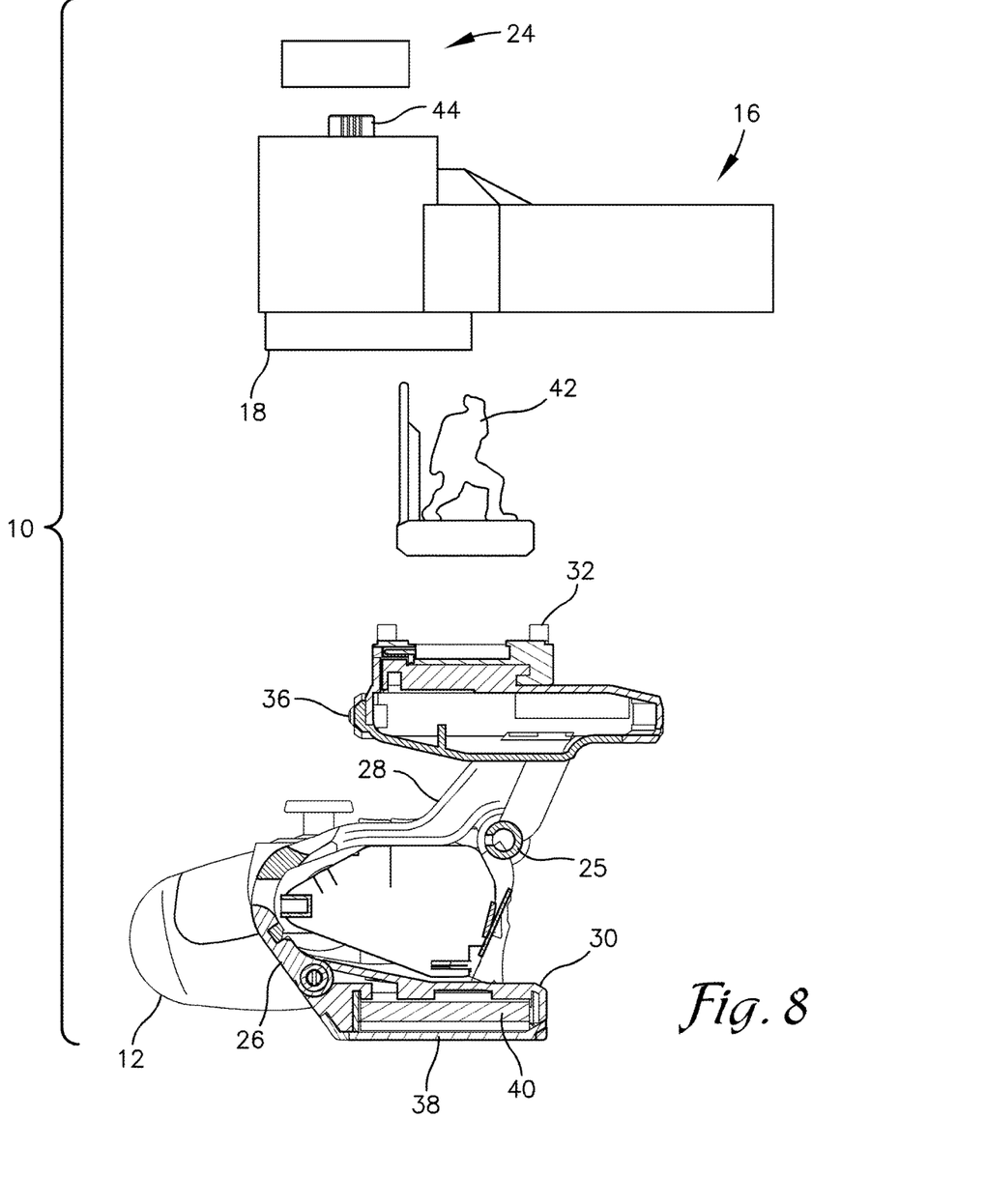
FIG. 8 depicts a cross-sectional view of the mount for the modular game accessory as attached to the video game controller, a base unit suitable for attachment to the mount, and an add-on module connectable to the base unit.

Turning now to FIG. 8, a cross-sectional view of mount for the modular game accessory as attached to the video game controller, a hull unit suitable for attachment to the mount, and an add-on module connectable to the hull unit are depicted. In this figure, the clamshell nature of mount 14 as is it attached to game controller 12 can be seen. As depicted, latch 26 is closed, thereby securing mount 14 to game controller 12. When latch 26 is disengaged, upper mount 28 and lower mount 30 can pivot around hinge 25 so that game controller 12 can be removed. In the depicted embodiment, battery door 38 can also be removed to replace or charge battery or batteries 40 used to power mount 14.

Also shown is a cross-sectional view of modular game accessory 16. In some embodiments, hull unit 18 includes a further add-on module slot corresponding to pilot 42 (or an analogous driver, as appropriate to the hull unit). Such a pilot or driver module may also be referred to more generally as a "character module." In some embodiments, character module 42 may connect directly to mount 14, and hull unit 18 connects on top of hull unit 18. In some embodiments and some hull units, multiple character add-in slots may be available corresponding to different crew roles for a vehicle. For example, a tank hull unit may include character slots for a driver, a gunner, and a commander. As with other add-on modules, the character modules may affect various properties or constellations of properties of the virtual avatar. For example, the speed and maneuverability of the virtual avatar may be increased when a skilled pilot is added to modular game accessory 16, while a skilled gunner may increase the accuracy of some or all of the attached weapons modules. As shown, add-on modules such as add-on leaf module 24 may also include electrical connectors 44 for communication with hull unit 18, and ultimately with computer 102. In this way, the effects of each add-on module can be provided by the add-on module itself, for example by an identifier stored in the module.

Figure 9:
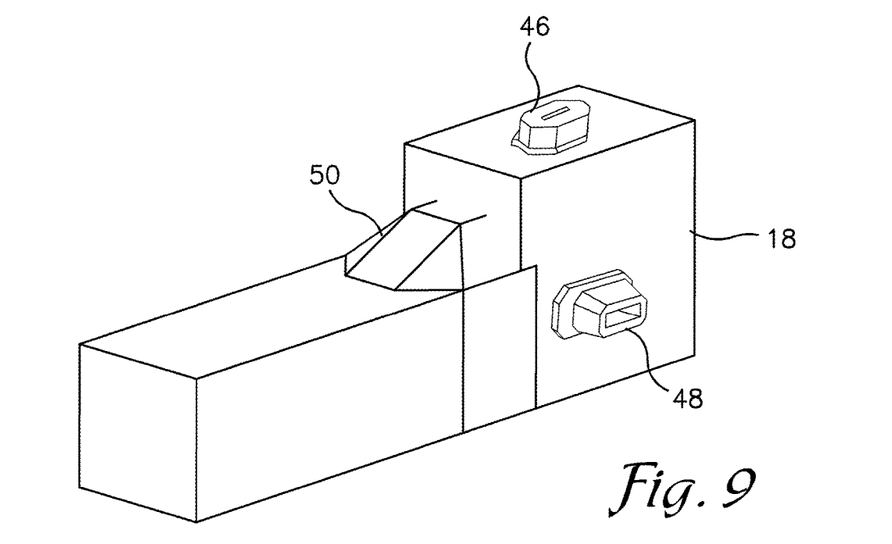
FIG. 9 depicts an oblique front view of the base unit attachable to the mount of FIGS. 6 and 7.

Turning now to FIG. 9, an oblique front view of a hull unit attachable to the mount of FIGS. 6 and 7 is depicted. As can be seen, base hull unit 18 includes one or more connectors 46 and 48 for connecting add-on modules such as extension module 20 for attaching to the sides of base unit 18, leaf module 22 for attaching to extension modules 20 (or to the sides of base unit 18 directly), and leaf module 24 for attaching to the top of base unit 18. In some embodiments, all of these connectors are standardized so that, for example, a particular add-on module can be used as a turret module, a wing module, or a wingtip pod module. In other embodiments, different physical connectors are used for each type of add-on module so that modules are dedicated to a particular type of port. Thus, leaf module 24 could only connect with connector 46, and extension module 20 could only connect with connector 48. Also depicted is cockpit 50. As described above, in some embodiments, cockpit 50 can be opened to add a pilot character module 42. In other embodiments, cockpit 50 is fixed, and characters are attached to mount 14 before base hull unit 18 is attached. In embodiments where connectors for the various modules are standardized, pilot character modules 42 may use a different type of connector to distinguish them from other types on add-on module.

Figure 10:
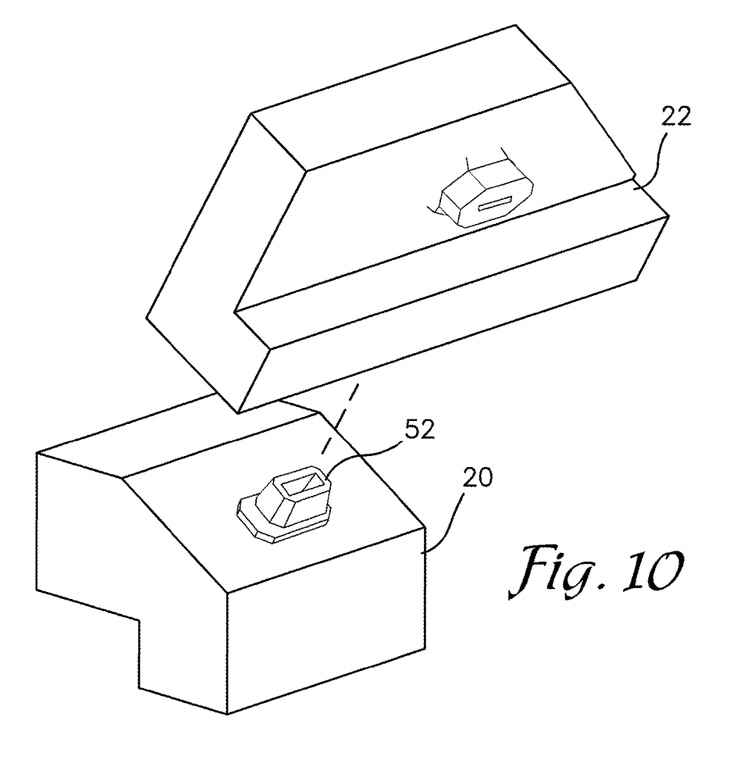
FIG. 10 depicts a wing module connectable to the hull unit of FIG. 9 and an add-on module connectable to the wing module.

Turning now to FIG. 10, a wing module (i.e., a logical extension module molded to look like the wing of a spaceship) connectable to the hull unit of FIG. 9 and weapons rack module (i.e., another logical extension module molded to looks like a wing-mounted weapons rack) connectable to the wing module is depicted. As can be seen, certain add on modules (such as, for example, the depicted module 20) may themselves include additional expansion ports 52 for adding additional add-on modules such as extension module 22. Of course, leaf modules such as leaf module 24 could also be connected directly to module 20. Similarly, where modular game accessory 16 represents a tank, a turret module may include one or more expansion ports for weapon pods. Broadly, any collection of add-on modules connected directly or indirectly to mount 14 to make a modular game accessory 16 is contemplated as being within the scope of the invention. In particular, extension modules may connect to other extension modules in addition to base hull unit 18 directly, and may or may not have leaf modules attached to them.

In some embodiments, "blank" modules can also be provided for further customization, such that players can create a physical and virtual part with their preferred (physical and virtual) visual appearance and properties. Such modules may only include the electronics and connectors, such that a player can create their own physical housing with their desired appearance using, for example, a 3D printer, a print-and-ship service, a packaged part kit, or any other method. In some such embodiments, the user may be able to specify the desired virtual appearance and properties using the video game, a dedicated application on the computer or video game console, or a dedicated programming cradle controlled by another computing device. The desired appearance and properties can be stored directly on the module or associated with a unique identifier for the blank module in an online data store, as discussed in additional detain below.

Figures 11, 12:
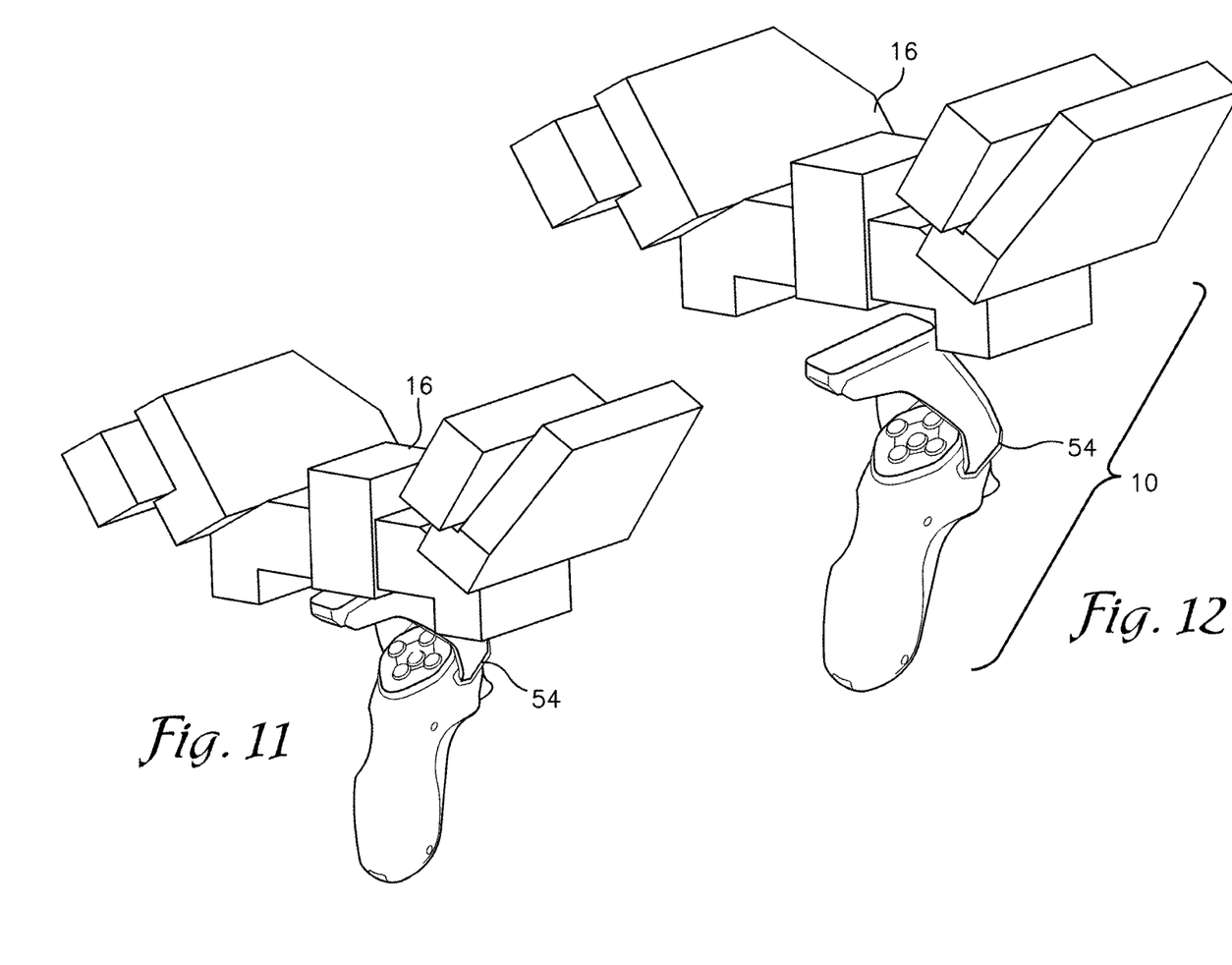
FIG. 11 depicts an oblique rear view of the modular game accessory attached to a dedicated controller with integrated mount.
FIG. 12 depicts an oblique rear view of the modular game accessory as detached from the dedicated controller with integrated mount.

Turning now to FIG. 11, an oblique rear view of the modular game accessory attached to a dedicated controller with integrated mount is depicted. Here, modular game accessory 16 is attached to a dedicated controller 54. This may be desirable if, for example, computer 102 being used with modular game accessory 16 is a PC and thus does not have a standard controller suitable for attaching mount 14. Alternatively, dedicated controller may be usable in a single hand, unlike the two-handed operation of controller 12. This allows the free hand to more quickly interchange modules for modular game accessory 16. Alternatively, this may allow for the simultaneous use of two modular game accessories 16 by the player to control two virtual avatars in-game.

Turning now to FIG. 12, an oblique rear view of the modular game accessory as detached from the dedicated controller with integrated mount is depicted. As can be seen, in the depicted embodiment, a physical/electrical mounting point substantially similar to that of mount 14 is integrated into dedicated controller 54. Thus modular game accessory 16 can be used with either dedicated controller 54 or with conventional game controller 12 in combination with mount 14. In some embodiments, such as that depicted in FIG. 12, dedicated controller 54 includes only the subset of those controls of conventional game controller 12 used with the video game corresponding to modular game accessory 16. As shown, the analog sticks, directional pad, touch pad, and several of the triggers have been omitted, while the buttons and gyroscopic controls have been retained. In other embodiments, dedicated controller 54 includes all of the controls and other functionality of conventional game controller 12, and adds the attachment point and other functionality of mount 14.

Operation of Embodiments of the Invention

Figure 13:
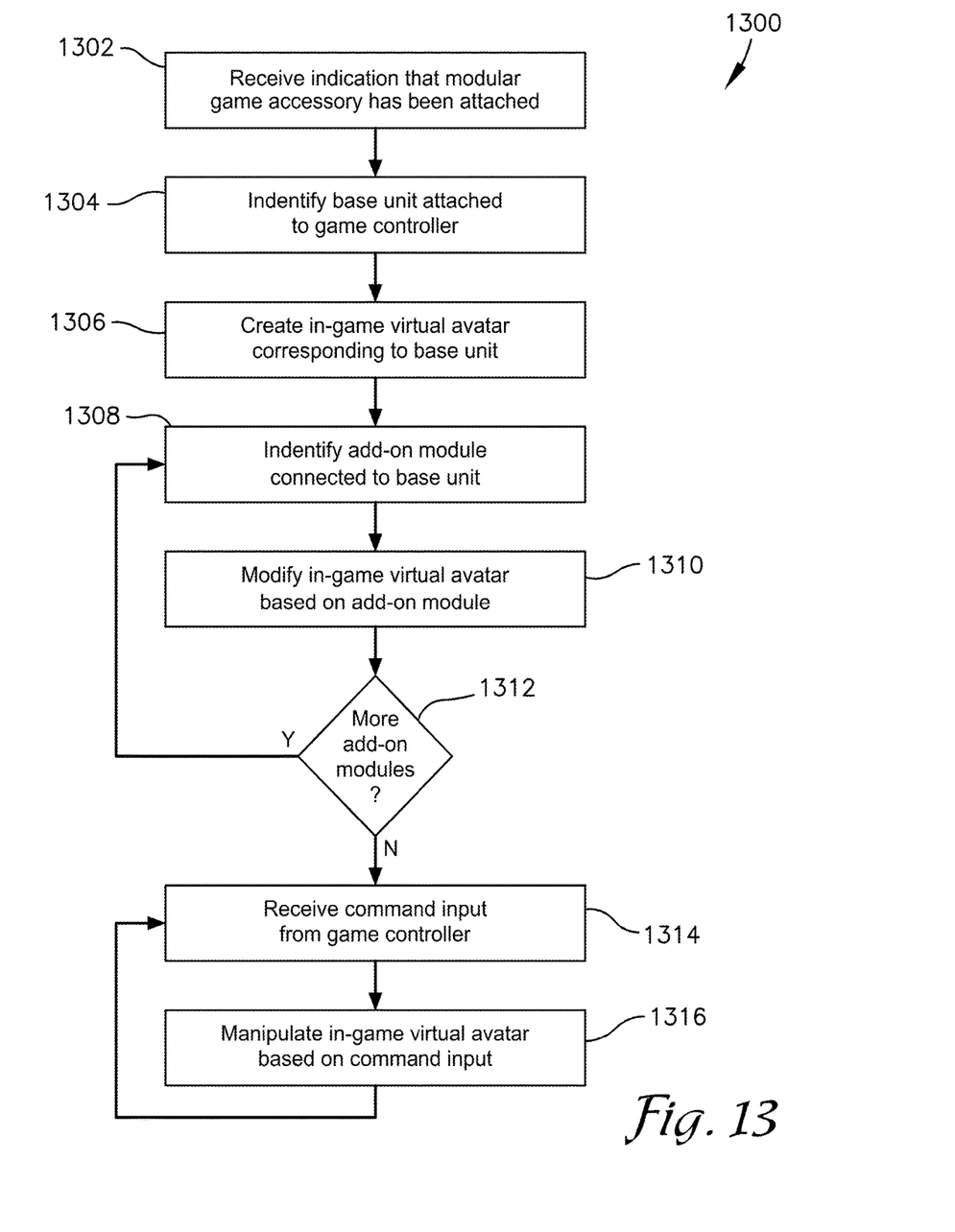
FIG. 13 depicts a flowchart depicting a method of operating a modular game accessory with a video game in accordance with embodiments of the current invention.

Turning now to FIG. 13, a flowchart depicting a method of operating a modular game accessory with a video game in accordance with embodiments of the current invention is depicted and referred to generally by reference numeral 1300. Initially, at step 1302, an indication is received that a modular game accessory has been connected to the video game controller being used. In some embodiments, multiple players may each have their own game controller and corresponding modular game accessory and in-game virtual avatar. In such embodiments, the system can track which modular game accessory is attached to which game controller so that each player operates the appropriate virtual avatar in game. In some embodiments, the controller automatically detects when the modular game accessory is attached, replaced, or modified.

Next, at step 1304, the system determines the type and/or identity of the base unit attached to the video game controller. In some embodiments and/or games, different vehicle types may be usable. For example, a particular game may have levels where a spaceship is required and levels where a ground vehicle such as a tank is required. Alternatively, another game might have levels where either an airplane or a ground vehicle can be used. In such embodiments, the player can choose which vehicle they wish to use for the level by attaching a modular game accessory with the corresponding type of base unit. As described above, types of base unit can include a space ship, a race car, a boat or submarine, a tank, a mech or other robot, or any other type of vehicle. Other, non-vehicular types of modular game accessory are also contemplated as being within the scope of the invention.

Within a given type of base unit, there may be many different models. For example, there may be many types of base unit (or hull) for a spaceship, such as (various types of) fighter, bomber, cruiser, carrier, dreadnought, cargo ship, etc. Similarly, where the base unit type corresponds to a tank, various historically accurate or fictional tank chassis can be chosen by the player and (as described below) customized via modular add-ons. Other types of base unit may also have corresponding models of base unit available.

Processing then proceeds to a step 1306, where the system creates an in-game virtual avatar corresponding to the identified base unit is created. The in-game virtual avatar is broadly a digital representation of the player's character or vehicle which the player can control in order to play the video game. Broadly speaking, the in-game virtual avatar created may correspond virtually or in terms of capabilities to the modular game accessory that was attached at step 1302. Thus, for example, if the player has attached a fighter hull as the base unit, then the virtual avatar created would be a small, agile, and armed space ship and if the player attaches an M60 chassis, then the digital avatar would have appearance and capabilities similar to an M60 main battle tank.

Next, at step 1308, an add-on module attached to the base unit is identified. Broadly speaking, an add-on module is a physical representation of a component attachable to the base unit to add or modify the capabilities of the associated in-game virtual avatar. For example, where the base unit corresponds to a fighter model of space ship, add-on modules corresponding to various types of weapons (guns, lasers, missiles, etc.), wings or engines, fuel pods, or armor may be available. Similarly, for tanks, the add-on modules might correspond to main and off-axis weapons, treads, engines, and so on, while for a race car, the add-on modules might correspond to engine, transmission, tires, suspension, etc.

In some embodiments, the number of (physical or virtual) slots available for add-on modules may be limited to force the player to make trade offs between offensive and defensive capabilities, speed and range, and so forth. As described above, certain add-on modules may themselves include additional (physical and/or virtual) slots for other add-on modules. Thus, for example, the player might be offered the choice between a first set of wing modules offering high speed and maneuverability and a second set of wing modules offering lower speed and maneuverability but the ability to add additional weapons modules. As described above, in some embodiments, add-on modules may be restricted to particular physical slots on base unit. In other embodiments, add-ons are universal and can be inserted into any available slot.

In some embodiments, one or more special slots may be available for pilots, drivers, gunners, and other characters to further modify the capabilities of the in-game avatar. In some such embodiments, the character add-on modules may contribute variable capabilities to the in-game avatar depending on their experience level, which in turn depends on how much that particular character has been used in game. Thus, for example, a pilot which has been used for a large number of missions will have a higher level of skill (and therefore contribute more to the capabilities of the in-game avatar) than one which is being used for the first time. One of skill in the art will appreciate that the player may be given the option to customize the capabilities of the character modules when they are first used and as they are leveled up.

Once the add-on module has been identified, processing proceeds to step 1310, where the in-game avatar created at step 1306 is modified to reflect the add-on module identified at step 1308. The avatar can be modified both visually and in terms of its capabilities. For example, the base unit, add-on modules, and in-game avatar can be designed such that the in-game avatar resembles the assembled modular game accessory. The player's choice of character may also be visible through the cockpit of the in-game virtual avatar in some embodiments. Each add-on modules may also modify a capability or constellation of capabilities of the in-game avatar either positively or negatively. For example, a more powerful engine module may increase the speed of the in-game avatar, but also increase its weight and therefore decrease its maneuverability. As described above, each property of the in-game avatar may be modified by zero, one, or more than one add-on modules, and two add-on modules corresponding to the same slot may modify different properties, the same properties by different amounts, or the same properties by the same amount. In some embodiments, certain add-on modules have purely visual effects and do not modify any properties of the in-game avatar.

In some embodiments, add-on modules may contain storage readable and/or writable by the system. Thus, for example, the modules can store digital customizations chosen by the user, such as capability upgrades or visual customizations such as colors, patterns, apparel, skins, etc. In some embodiments, modules can store game progress. For example, in some embodiments, the in-game components corresponding to the add-on modules may be damaged over the course of the game. The add-on-modules may store this damage and/or visually reflect their status, and the damage may affect the capabilities modified by that add-on module. Thus, for example, a damaged engine may reduce the speed of the in-game avatar. In some embodiments, the player can remedy this problem either via in-game repairs (thus resetting the saved damage) or by physically replacing the "damaged" add-on modules with undamaged ones.

In this way, the player can use their customized avatar on another computing device or gaming console, even without a shared network resource, simply by attaching it to a connected game controller. As another advantage of this approach, a player could collect multiple copies of the same component, and store different customization and progress on each. In a variation of this embodiment, each module stores a globally unique identifier such as a serial number that can be used to access module properties in a networked data store. The gaming system can then connect to this server to read or write customization data for each module.

In some embodiments, each module includes a cryptographic verifier allowing the system to verify that the module is authentic and not counterfeit. For example, a tamper-resistant chip may store a private key for that device that can be verified when the modular game accessory is connected to a game console. In some such embodiments, this capability is combined with the unique identifier described above to ensure that the capabilities and modifications to each module are not tampered with.

Once the in-game avatar has been modified to reflect the add-on module identified at step 1308, processing proceeds to decision 1312 where it is determined whether any additional add-on modules remain which have not yet been processed to modify the in-game avatar. If additional modules remain, processing returns to step 13088. If all add-on modules have been processed, processing instead proceeds to step 1314.

At step 1314, command input is received from assembly 10 of game controller 12, mount 14 and modular game accessory 16 (or assembly 10 of dedicated controller 54 and modular game accessory 16). This input may correspond to the player's actuation of the controls of the video game controller, to accelerometer or gyroscope data indicating that the player is physically manipulating assembly 10 to control it, or from the player's actuation of controls on the mount or modular game accessory itself. In some embodiments, controller 12 or controller 54 includes accelerometers and/or gyroscopes for detecting gestural inputs. In other embodiments, the base unit includes the accelerometers and/or gyroscopes and passes the data to the controller to be communicated to computer 102. In still other embodiments, the base unit communicates independently with computer 102.

Next, at step 1316, the in-game avatar is manipulated in accordance with the control input received at step 1314. Thus, for example, if the player tilts the assembly left or right, the in-game avatar might steer left or right accordingly. If the player uses a particular button on the controller, the avatar might accelerate, and if the player actuates a trigger on the controller, the avatar might fire the weapons. In this way, the motion and actions of the in-game avatar reflect the motions and actions of the modular game accessory and controller, much like the appearance and capabilities of the in-game avatar reflect that of the modular game accessory. Processing then returns to step 1314 and steps

1314 and 1316 repeat until the player changes or modifies the modular game accessory (in which case processing restarts at step 1302).

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for playing a video game, comprising:
   a modular game accessory comprising:
      a base unit including a plurality of slots for attaching add-on modules;
      a plurality of add-on modules, each add-on module attachable to the base unit in a tree topology, wherein each of the plurality of add-on modules attached to the base unit is electrically coupled to the base unit to provide power to the add-on module and communication with the base unit;
      a mount for mounting the modular game accessory to a video game controller, wherein the video game controller includes motion controls;
      one or more computer-readable media storing computer-executable instructions that, when executed, allow a player to control an in-game avatar in the video game by physically manipulating modular game accessory such that a motion of the in-game avatar reflect a motion of the modular game accessory and controller,
   wherein the motion of the modular game accessory is transferred to the video game controller via the mount,
   wherein the transferred motion of the modular game accessory is detected by the motion controls of the video game controller,
   wherein the motion of the modular game accessory detected by the motion controls of the video game controller are communicated a video game console by the video game controller,
   wherein an appearance and one or more capabilities of the in-game avatar are determined by the modular game accessory connected to the video game controller while playing the video game,
   wherein each of the plurality of the add-on modules connected to the base unit affects at least one capability of the in-game avatar.

2. The system of claim 1, wherein the base unit represents a vehicle and the in-game avatar is a vehicle.

3. The system of claim 2, wherein the plurality of add-on modules includes one or more weapons modules.

4. The system of claim 2, wherein the plurality of add-on modules includes a character module.

5. The system of claim 2, wherein the plurality of add-on modules includes a leaf module.

6. The system of claim 2, wherein the vehicle is a space ship, and wherein the in-game avatar is a space ship.

7. The system of claim 6, wherein the plurality of add-on modules includes one or more wing modules.

8. A method of using a modular game accessory to play a video game, comprising the steps of:
   receiving an indication that the modular game accessory comprising a base unit and a plurality of add-on-modules connected in a tree topology has been mounted on a video game controller,
   wherein the video came controller includes motion controls,
   wherein each of the plurality of add-on modules attached to the base unit is electrically coupled to the base unit to provide power to the add-on module and communication with the base unit;
   identifying the base unit of the modular game accessory;
   creating an in-game avatar in the video game corresponding to the identified base unit;
   identifying an add-on module of the plurality of add-on-modules attached to the base unit;
   modifying at least one characteristic of the in-game avatar based on the identified add-on module;
   receiving motion data from the video game controller indicating that a player has physically manipulated the modular game accessory, thereby also physically manipulating the video game controller on which the modular video game accessory is mounted and the motion controls thereof;
   processing the motion data as a command input from the motion controls of the video game controller; and
   manipulating the in-game avatar based on the received command input, such that one or more motions of the in-game avatar reflect one or more motions of the modular game accessory and controller.

9. The method of claim 8, further comprising the steps of:
   identifying an additional add-on module attached to the base unit; and
   modifying at least one additional characteristic of the in-game avatar based on the identified additional add-on module.

10. The method of claim 8, wherein the add-on module is a character module.

11. The method of claim 8, wherein the add-on module is a weapons module.

12. The method of claim 8, wherein the add-on module is a leaf module.

13. The method of claim 8, wherein the base unit corresponds to a space ship hull, and wherein the in-game avatar is a space ship.

14. The method of claim 13, wherein the add-on module is a wing module.

15. The method of claim 14, wherein
   a wingtip add-on module is connected to the wing module, and
   wherein the method further comprises the steps of:
   identifying the wingtip module as being attached to the wing module, and
   modifying an additional characteristic of the in-game avatar based on the identified wingtip module.

16. A system for playing a video game, comprising:
   a modular game accessory comprising:
      a base unit including a plurality of slots for attaching add-on modules;
      a plurality of add-on modules, each add-on module attachable to the base unit in a tree topology, wherein each of the plurality of add-on modules attached to the base unit is electrically coupled to the base unit to provide power to the add-on module and communication with the base unit;

a mount for mounting the modular game accessory to a video game controller, wherein the video game controller includes motion controls;

one or more computer-readable media storing computer-executable instructions that, when executed, perform a method of using the modular game accessory to play the video game, comprising the steps of:

receiving an indication that the modular game accessory has been mounted on the video game controller;

identifying the base unit of the modular game accessory;

creating an in-game avatar in the video game corresponding to the identified base unit;

identifying an add-on module of the plurality of add-on modules that is attached to the base unit;

modifying at least one characteristic of the in-game avatar based on the identified add-on module;

receiving motion data from the video game controller indicating that a player has physically manipulated the modular game accessory, thereby also physically manipulating the video game controller on which the modular video game accessory is mounted and the motion controls thereof;

processing the motion data as a command input from the motion controls of the video game controller; and     manipulating the in-game avatar based on the received command input, such that one or more motions of the in-game avatar reflect one or more motions of the modular game accessory and controller.

17. The system of claim 16, wherein the method further comprises the steps of:

identifying an additional add-on module of the plurality of add-on modules attached to the base unit; and     modifying at least one additional characteristic of the in-game avatar based on the identified additional add-on module.

18. The system of claim 16, wherein the base unit corresponds to a space ship hull, and wherein the in-game avatar is a space ship.

19. The system of claim 16, wherein the add-on module is a character module.

\* \* \* \* \*